US006431279B1

(12) United States Patent
Zaid et al.

(10) Patent No.: US 6,431,279 B1
(45) Date of Patent: Aug. 13, 2002

(54) PROCESS FOR IN SITU GENERATION OF CHLORINE DIOXIDE IN OIL AND GAS WELL FORMATIONS

(75) Inventors: Gene H. Zaid; Donald W. Sanders, both of Sterling, KS (US)

(73) Assignee: Jacam Chemicals, L.L.C., Sterling, KS (US)

( * ) Notice: Subject to any disclaimer, the term of this patent is extended or adjusted under 35 U.S.C. 154(b) by 0 days.

(21) Appl. No.: 09/616,393

(22) Filed: Jul. 14, 2000

(51) Int. Cl.[7] .......................... E21B 37/00; E21B 43/22
(52) U.S. Cl. .................... 166/263; 166/300; 166/305.1; 166/312; 507/929
(58) Field of Search .................. 166/263, 300, 166/305.1, 311, 312; 507/277, 927, 929

(56) References Cited

U.S. PATENT DOCUMENTS

| | | | |
|---|---|---|---|
| 3,070,164 A | * 12/1962 | Gordon, Jr. ................ | 166/300 |
| 3,249,536 A | * 5/1966 | Jones ......................... | 166/300 |
| 3,528,503 A | * 9/1970 | Crowe ........................ | 166/300 |
| 3,529,666 A | * 9/1970 | Crowe ........................ | 166/300 |
| 4,247,531 A | 1/1981 | Hicks | |
| 4,473,115 A | * 9/1984 | Oakes ................... | 507/277 X |
| 4,590,057 A | 5/1986 | Hicks | |
| 4,846,981 A | * 7/1989 | Brost ......................... | 507/227 |
| 4,871,022 A | * 10/1989 | McGlathery ................ | 166/300 |
| 4,892,148 A | * 1/1990 | Mason ................... | 166/312 X |
| 4,945,992 A | * 8/1990 | Sacco ..................... | 166/312 X |
| 5,031,700 A | * 7/1991 | McDougall et al. . | 166/305.1 X |
| 5,204,081 A | 4/1993 | Mason et al. | |
| 5,964,290 A | * 10/1999 | Riese et al. ................. | 166/263 |
| 5,967,233 A | * 10/1999 | Riese et al. ................. | 166/263 |

OTHER PUBLICATIONS

Jacam Product Bulletin; WSR 3200 Calcium Sulfate Dissolver.
Energy Chemicals literature; Well Stimulations with Diklor's.
Vulcan Chemicals brochure; Sodium Chlorite in Water Treatment.
Capitol Controls literature; Chlorine Dioxide Generating Systems—Series WX3200.
Bello Zon literature; Chlorine Dioxide Generating Plant.
Vulcan Chemicals brochure; Sodium Chlorite.

* cited by examiner

Primary Examiner—George Suchfield
(74) Attorney, Agent, or Firm—Hovey Williams LLP

(57) ABSTRACT

An improved method for the chlorine dioxide treatment of oil and/or gas well bores is provided, which eliminates the need for costly and complex chlorine dioxide-generating equipment and yields very high concentrations of chlorine dioxide down hole. The preferred method involves the introduction of reactant(s) into a well and causing a reaction to generate chlorine dioxide in situ. Chlorite and hypochlorite ion sources (e.g., sodium chlorite and sodium hypochlorite) are introduced into the well along with an acid. The well may then be flushed with water to force the reactants and chloride dioxide downwardly to the well formation.

36 Claims, 1 Drawing Sheet

PROCESS FOR IN SITU GENERATION OF CHLORINE DIOXIDE IN OIL AND GAS WELL FORMATIONS

BACKGROUND OF THE INVENTION

1. Field of the Invention

The present invention is broadly concerned with an improved method for the treatment of oil and/or gas well formations using chlorine dioxide. More particularly, the invention pertains to such methods wherein substantial quantities of chlorine dioxide are generated in situ within a well, thereby eliminating the need for complex equipment for the above-ground generation of chlorine dioxide and also permitting use of substantially greater concentrations of chlorine dioxide at the well formation.

2. Description of the Prior Art

It is well known that during the production life of oil and/or gas wells, the well formations tend to become plugged with iron sulfides and sulfates or polymers added to injection water for increasing water viscosity and sweep efficiencies. Such plugging decreases well production. In response to this problem, a well-established technique is to inject chlorine dioxide into the well. Chlorine dioxide rapidly oxidizes the naturally occurring iron compounds, and also is effective at breaking up and removing organic solids and added polymers.

The chemistry of chlorine dioxide precludes its storage, and U.S. Department of Transportation regulations prohibit truck transport of chlorine dioxide solutions. As a consequence, well treatments using chlorine dioxide have heretofore required complex, costly equipment for generation of chlorine dioxide at the well site.

In one commercial technique known as the "DIKLOR-S" process, a chlorine dioxide generator is moved adjacent a well to be treated, along with a water truck and a high pressure pump truck. Sodium chlorite, sodium hypochlorite and hydrochloric acid are added to the generator and water is supplied thereto. An aqueous solution of chlorine dioxide is produced by the generator which is then introduced into the well. The maximum concentration of chlorine dioxide obtainable using this process is about 4500 ppm.

It will be appreciated that the capital costs associated with equipment for the safe generation and handling of chlorine dioxide at a well site is considerable. Moreover, owing to the dangerous nature of chlorine dioxide, skilled, experienced operators must be employed. In fact, these capital and personnel costs, which must of course be passed along to the well owner, have significantly limited the use of chlorine dioxide as a well stimulant. There is accordingly a real and unsatisfied need in the art for an improved process which allows the use of high concentrations of chlorine dioxide down hole for well stimulation purposes, while at the same time substantially minimizing capital and manpower costs.

SUMMARY OF THE INVENTION

The present invention overcomes the problems outlined above and provides a new method for the treatment of oil and/or gas wells using chlorine dioxide to stimulate production. Instead of generating chlorine dioxide above ground and then introducing it into the well, the present invention involves the in situ below grade generation of chlorine dioxide. In this way, all of the complex and costly equipment characteristic of the prior art chlorine dioxide well stimulation methods is eliminated. Moreover, because the chlorine dioxide is generated in situ, substantially greater concentrations of chlorine dioxide can be used. Indeed, in preferred forms, the in situ reaction of the invention generates a reaction product having at least about 10,000 ppm, and more preferably at least about 35,000 ppm, and most preferably at least about 90,000 ppm of chlorine dioxide therein.

In preferred forms, an oil and/or gas well having an upright passageway leading to an underground formation is treated, by introducing one or more reactants into the passageway and causing the desired chemical reaction to occur down hole using the one or more reactants so as to generate chlorine dioxide. Normally, chlorite ion and hypochlorite ion are added to the well, along with an acid (e.g., hydrochloric, sulfuric, sulfurous, hydrofluoric, phosphoric, phosphorous and acetic). The ions are provided by appropriate chlorite ion and hypochlorite ion sources, typically alkali metal and alkaline earth chlorites and hypochlorites. The chlorite and hypochlorite ion sources can be added as separate reactants, or can be in the form of a stabilized chlorite/hypochlorite ion mixture.

Virtually all producing wells have a standing column of formation fluid within the annulus thereof. Therefore, the preferred chlorite ion, hypochlorite ion and acid reactants are added atop this standing column. In order to drive the reactants and reaction products down to formation level, a pushing fluid (usually water) is added after the reactants are introduced into the well in sufficient quantity to force these materials down to formation level.

The chlorite ion, hypochlorite ion and acid reactants may be added in serial order or with the intermediate introduction of water therebetween. In any case, these reactants are introduced at sufficient quantities so as to insure the generation of copious amounts of chlorine dioxide within the well.

DETAILED DESCRIPTION OF THE PREFERRED EMBODIMENT

Figure 1:
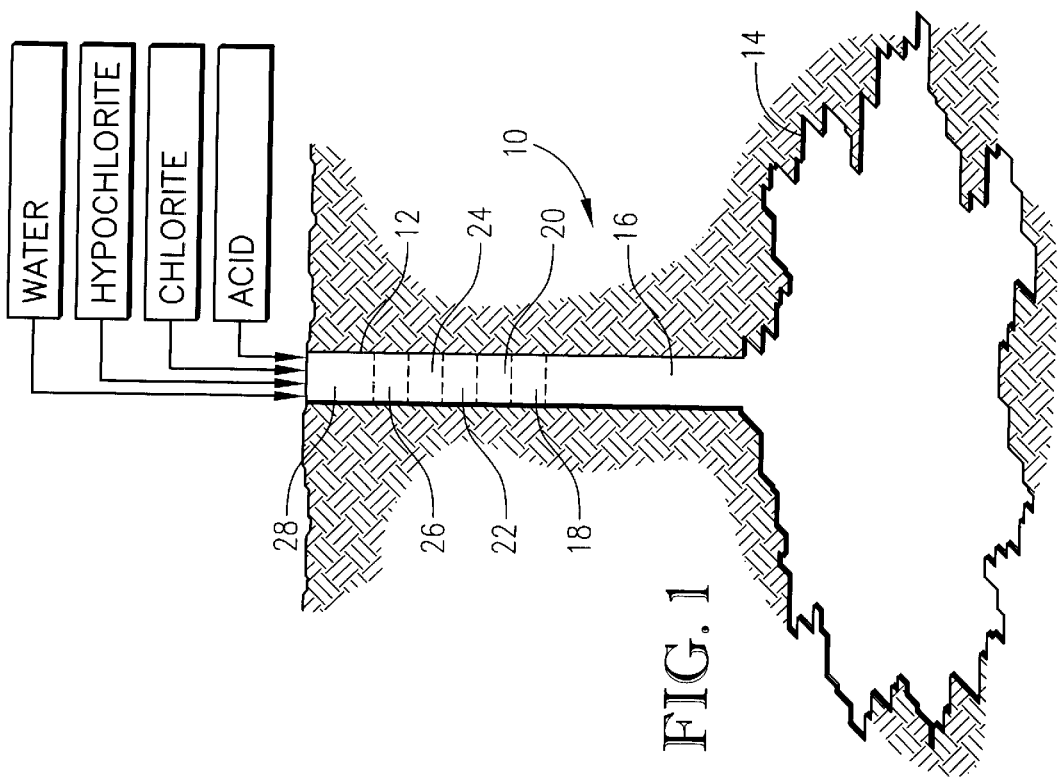
FIG. 1 is a schematic view illustrating a typical oil or gas well and with reactant introduction steps in accordance with the invention also shown.

FIG. 1 depicts an oil and/or gas well 10 including an upright passageway 12 and a below grade formation 14. As is well known, the formation 14 may over time become plugged, thus reducing production. The well also exhibits a standing column 16 of well fluid which extends upwardly from the formation 14 to fill a substantial portion of the passageway 12.

In accordance with the invention, reactants are added into the passageway 12 in order to generate chlorine dioxide in situ within the well 10. In the illustrated embodiment, a quantity of hypochlorite ion 18 is first added atop column 16, followed by a quantity of water 20. Next, a quantity of chlorite ion 22 is added followed by another quantity of water 24. This is followed by a quantity of acid 26. Finally, a sufficient quantity of water 28 is added so as to drive the fluid therebelow (which may be the aforementioned reactants and/or chlorine dioxide reaction product) down to the level of formation 14. At this point, any unreacted ingredients combined to generate chlorine dioxide which then acts on the formation 14 in the well known fashion to at least partially unplug the latter.

Figure 2:
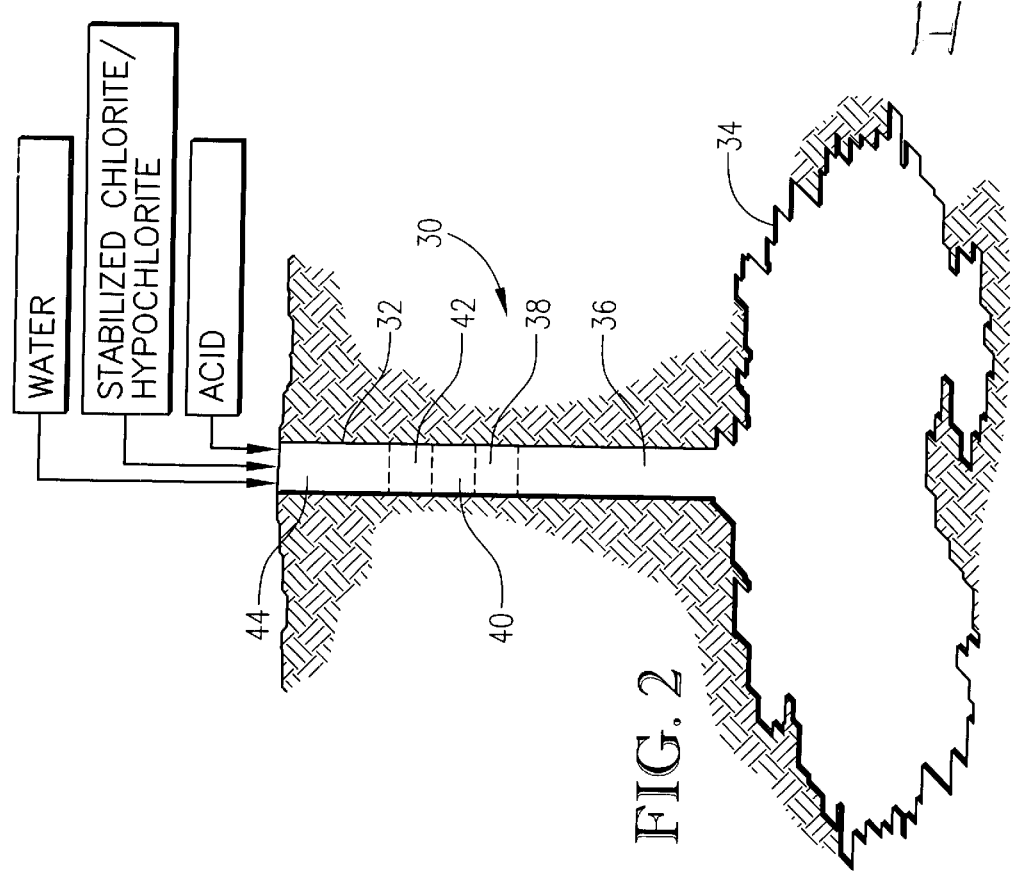
FIG. 2 is a schematic view similar to that of FIG. 1, but showing alternate reactant introduction steps in accordance with the invention.

FIG. 2 illustrated another well 30 having an upright passageway 32 and formation 34. Here again, a standing column 36 of well fluid is present within the passageway. In this embodiment, a quantity 38 of stabilized chlorite/hypochlorite is added atop column 36, followed by a quantity 40 of water and a quantity 42 of hydrochloric acid. Thereafter, a fluid-pushing quantity of water 44 is added so as to drive the materials down to the level of formation 34. In this embodiment, the stabilized chlorite/hypochlorite mixture is made up of chlorite and hypochlorite ion sources (e.g., sodium hypochlorite) together with an amount of base (an alkali metal or alkaline earth hydroxide is preferred) sufficient to stabilize the mixture and inhibit reactions between the chlorite and hypochlorite ions. The stabilized mixture preferably includes from about 2–80% by eight chlorite ion (more preferably from about 10–31.25% by weight)from about 1–15% by weight hypochlorite ion (more preferably from about 5–12.5% by weight) and from about 0.1–5% by weight base (more preferably from about 0.5–2% by weight). The pH of the stabilized material should be from about 9.5–11.

It is preferred that the reactants be introduced with reasonable dispatch into an oil and/or gas well. That is, the active ingredients are usually added in serial order without any significant delay between the introduction steps. This assures that the proper reaction mixture needed to generate chlorine dioxide is formed within the well before undesirable side reactions may occur.

The following examples set forth certain preferred well treatment processes of the invention. It is to be understood, however, that these examples are provided by way of illustration and nothing therein should be taken as a limitation upon the overall scope of the invention.

In the following examples, several reactants are added to oil or gas wells in various ways and combinations. In each instance, however, the sodium hypochlorite reactant is an aqueous dispersion of from about 5–15% by weight sodium hypochlorite depending upon supplier; the sodium chlorite reactant is a 31.25% solution of sodium chlorite in water; and the acid component is a mixture of hydrochloric acid (9–37% depending upon supplier), isopropanol (20% by weight) and nonionic surfactant (NP-13) at a level of 30% by weight.

EXAMPLE 1

A gas well having a Council Grove Dolomite formation and a depth of 2,500 feet was treated in accordance with the invention. Before treatment, the well was producing 25 mcf/day with a 70 lb. pressure on the well annulus. The treatment procedure first involved shutting the well in, followed by the serial addition of 55 gal. of sodium hypochlorite, 55 gal. of sodium chlorite, 1 barrel of 2% KCl water, 55 gal. of acid, 2 barrels of 2% KCl water, and 40 barrels of 2% KCl water. Each introduction was made immediately after completion of the preceding introduction. The well was left shut in for 48 hours, and was then returned to production. At this point, the well produced 50 mcf/day with 130 lbs. pressure at the annulus.

EXAMPLE 2

In this case, an oil and gas well having a Mississippi Chert formation and a depth of 4,400 feet was treated. Before production, the well produced 22 barrels of water, 4 mcf and 3.5 barrels of oil per day. In the procedure, the well was shut down (pressure tubing to 150 psi), and 10 barrels of lease water were pumped down the well annulus. Thereupon, the following were added in serial order: 27.5 gal. acid, 55 gal. sodium hypochlorite, 55 gal. sodium chlorite, and 27.5 gal. acid. At this point, 45 barrels of lease water were then introduced. Production was resumed after 24 hours. Post-production, the well yielded 30 barrels water, 50 mcf and 4 barrels oil per day.

EXAMPLE 3

In another oil and gas well with a Mississippi Chert formation and a depth 4,455 feet, the production was 20 barrels water, 20 mcf and a trace of oil per day. In treating the well, after shut down, 10 barrels of lease water was introduced, followed by the serial addition of 27.5 gal. acid, 55 gal. sodium hypochlorite, 55 gal sodium chlorite, and 27.5 gal. acid. An additional 45 barrels of lease water were then introduced into the well. Production was resumed after 24 hours, giving 25 barrels of water, 35 mcf and a trace of oil per day.

EXAMPLE 4

An oil and gas well with a Mississippi Chert formation and a depth 4,320 feet had a production of 1.5 barrels oil, 3 barrels water and 20 mcf/day. The treatment involved shutting the well down followed by introduction of 10 barrels of fresh water, 27.5 gal. acid, 55 gal. sodium hypochlorite, 55 gal. sodium chlorite, and 27.5 gal. acid. Next, 45 barrels of fresh water mixed with 5 gal. of SA-941 (surfactant) was added. Production was resumed after 24 hours, yielding 3.34 barrels oil, 5 barrels water and 45 mcf/day.

EXAMPLE 5

A well having a Mississippi Dolomite formation and a depth of 4,300 feet was treated in accordance with the invention. Prior to treatment, the well was producing 4 barrels of oil and 42 barrels of water per day. After shut-in, 1 barrel of lease water was introduced into the well, followed by 55 gal. each of sodium hypochlorite, sodium chlorite and acid down the well tubing. Next, 24 barrels of water was pumped down the annulus. After 24 hours, the well was returned to production and yielded 15 barrels of oil and 42 barrels of water per day.

EXAMPLE 6

A Kansas gas well having a Chase-Hugoton sand formation and a depth of 2,600–2,700 feet was treated. Before production, the well yielded 25 mcf/day. After shut-in, 5 gal. of WSF-9021 (non-ionic surfactant) was mixed into 15 barrels of 2% KCl water and was introduced into the well. Thereafter, 5 barrels of water were pumped down the annulus, followed by introduction of a barrel each of sodium hypochlorite, sodium chlorite and acid. An additional 10 barrels of water were then pumped down the annulus. After 24 hours, the well production was resumed, yielding 55 mcf/day.

EXAMPLE 7

Another Kansas gas well having a Chase-Hugoton sand formation and a depth of 2,600–2,700 feet was treated. The well had a production of 35 mcf/day. After shut-in, 5 gal. of WSF-9021 was mixed in 15 barrels of 2% KCl water and introduced into the well. Thereafter, 5 barrels of 2% KCl water was introduced, followed by 55 gal. each of sodium hypochlorite, sodium chlorite and hydrochloric acid. An additional 15 barrels 2% KCl water was then added. The well was left shut-in for 12 hours and then production was resumed. The post-production yield was 90 mcf/day.

We claim:

1. A method of treating an oil and/or gas well having an upright passageway leading to an underground formation, said method comprising the steps of introducing a plurality of reactants into said passageway, and causing a chemical reaction to occur using said reactants in order to generate chlorine dioxide in situ within said well.

2. The method of claim 1, said reaction generating a reaction product having at least about 10,000 ppm of chlorine dioxide therein.

3. The method of claim 2, said reaction generating at least about 90,000 ppm of chlorine dioxide therein.

4. The method of claim 1, said chlorite and hypochlorite ion being added as separate reactants.

5. The method of claim 4, said chlorite ion being introduced as a chlorite ion source selected from the group consisting of the alkali metal and alkaline earth metal chlorites, said hypochlorite ion being introduced as a hypochlorite ion source selected from the group consisting of the alkali metal and alkaline earth metal hypochlorites.

6. The method of claim 1, said chlorite and hypochlorite ion being derived from a stabilized mixture of chlorite and hypochlorite ion.

7. The method of claim 6, said stabilized mixture comprising chlorite ion and hypochlorite ion in an aqueous mixture, with a quantity of base sufficient to inhibit the reaction between chlorite ion and hypochlorite ion.

8. The method of claim 7, said chlorite ion derived from a source selected from the group consisting of the aikali metal and alkaline earth metal chlorites, said hypochlorite ion derived from a source selected from the group consisting of the alkali metal and alkaline earth metal hypochlorites.

9. The method of claim 8, said base selected from the group consisting of the alkali metal and alkaline earth metal hydroxides.

10. The method of claim 9, said stabilized mixture comprising sodium chlorite, sodium hypochlorite and sodium hydroxide in an aqueous mixture.

11. The method of claim 1, said passageway having therein a standing column of formation fluid, said introducing and reaction-causing steps comprising the steps of passing respective quantities of reactants selected from the group consisting of a chlorite ion source, a hypochlorite ion source and an acid into said passageway, and thereafter passing a pushing fluid into said passageway in sufficient quantity to force the liquid within said passageway downwardly to a point adjacent said formation.

12. The method of claim 11, including the step of introducing respective quantities of water into said passageway between the introduction of at least certain of said reactants.

13. The method of claim 12, said quantities of water being introduced into said passageway between the addition of each of said reactants.

14. The method of claim 11, said pushing fluid comprising water.

15. The method of claim 11, said acid selected from the group consisting of hydrochloric, sulfuric, sulfurous, hydrofluoric, phosphoric, phosphorous and acetic acids.

16. The method of claim 15, said acid comprising hydrochloric acid.

17. The method of claim 11, each of said reactants being introduced separated into said passageway.

18. The method of claim 11, said chlorite ion source and said hypochlorite ion source being introduced as a stabilized mixture into said passageway.

19. A method of treating an oil and/or gas well having an upright passageway leading to an underground formation, said method comprising the steps of introducing into said passageway a plurality of reactants which will generate chlorine dioxide and contacting said formation with an aqueous mixture including therein at least about 10,000 ppm of chlorine dioxide.

20. The method of claim 19, there being at least about 35,000 ppm of chlorine dioxide in said mixture.

21. A method of treating an oil and/or gas well having an upright passageway leading to an underground formation, said method comprising the steps of introducing one or more reactants into said passageway, and causing a chemical reaction to occur using said one or more reactants in order to generate chlorine dioxide in situ within said well, said introducing and reaction-causing steps comprising the steps of passing chlorite and hypochlorite ion into said passageway.

22. The method of claim 21, said chlorite and hypochlorite ion being added as separate reactants.

23. The method of claim 22, said chlorite ion being introduced as a chlorite ion source selected from the group consisting of the alkali metal and alkaline earth metal chlorites, said hypochlorite ion being introduced as a hypochlorite ion source selected from the group consisting of the alkali metal and alkaline earth metal hypochlorites.

24. The method of claim 21, said chlorite and hypochlorite ion being derived from a stabilized mixture of chlorite and hypochlorite ion.

25. The method of claim 24, said stabilized mixture comprising chlorite ion and hypochlorite ion in an aqueous mixture, with a quantity of base sufficient to inhibit the reaction between chlorite ion and hypochlorite ion.

26. The method of claim 25, said chlorite ion derived from a source selected from the group consisting of the alkali metal and alkaline earth metal chlorites, said hypochlorite ion derived from a source selected from the group consisting of the alkali metal and alkaline earth metal hypochlorites.

27. The method of claim 26, said base selected from the group consisting of the alkali metal and alkaline earth metal hydroxides.

28. The method of claim 27, said stabilized mixture comprising sodium chlorite, sodium hypochlorite and sodium hydroxide in an aqueous mixture.

29. The method of claim 21, said passageway having therein a standing column of formation fluid, said introducing and reaction-causing steps comprising the steps of passing respective quantities of reactants selected from the group consisting of a chlorite ion source, a hypochlorite ion source and an acid into said passageway, and thereafter passing a pushing fluid into said passageway in sufficient quantity to force the liquid within said passageway downwardly to a point adjacent said formation.

30. The method of claim 29, including the step of introducing respective quantities of water into said passageway between the introduction of at least certain of said reactants.

31. The method of claim 30, said quantities of water being introduced into said passageway between the addition of each of said reactants.

32. The method of claim 29, said pushing fluid comprising water.

33. The method of claim 29, said acid selected from the group consisting of hydrochloric, sulfuric, sulfurous, hydrofluoric, phosphoric, phosphorous and acetic acids.

34. The method of claim 33, said acid comprising hydrochloric acid.

35. The method of claim 29, each of said reactants being introduced separated into said passageway.

36. The method of claim 29, said chlorite ion source and said hypochlorite ion source being introduced as a stabilized mixture into said passageway.

* * * * *